United States Patent [19]
Howe

[11] 3,963,807
[45] *June 15, 1976

[54] POLYMERS OF ACRYLONITRILE AND AROMATIC OLEFINS WHICH CONTAIN GRAFTED RUBBER

[75] Inventor: King Lau Howe, Wilmington, Del.

[73] Assignee: E. I. Du Pont de Nemours and Company, Wilmington, Del.

[*] Notice: The portion of the term of this Patent subsequent to June 25, 1991, has been disclaimed.

[22] Filed: Nov. 6, 1972

[21] Appl. No.: 304,014

Related U.S. Application Data

[63] Continuation-in-part of Ser. No. 199,766, Nov. 17, 1971, Pat. No. 3,819,762.

[52] U.S. Cl. .................. 260/876 R; 260/29.6 AN; 260/879; 260/880 R; 526/342; 526/347
[51] Int. Cl.$^2$.......................................... C08L 51/04
[58] Field of Search ............ 260/876 R, 880, 85.5 R, 260/85.5 HC

[56] References Cited
UNITED STATES PATENTS
3,451,538  6/1969  Trementozzi ................... 260/876 R FOREIGN PATENTS OR APPLICATIONS
1,185,305  3/1970  United Kingdom............. 260/876 R
1,186,361  4/1970  United Kingdom............. 260/876 R

*Primary Examiner*—Murray Tillman
*Assistant Examiner*—J. Ziegler

[57]  ABSTRACT

A composition consisting essentially of (A) 65 to 99 percent by weight of a polymer consisting essentially of 76 to 85 percent by weight acrylonitrile polymerized units and 24 to 15 percent by weight polymerized units of at least one aromatic olefin containing 8 to 14 carbon atoms, said polymer having a melt viscosity of $10^4$ to $10^6$ poises at 220°C. and an inherent viscosity of from 0.3 to 1.0 deciliter per gram and (B) 1 to 35 percent by weight of grafted rubber, said grafted rubber consisting essentially of 30 to 50 percent by weight of a graft polymer consisting essentially of 61 to 85 percent by weight acrylonitrile polymerized units and 39 to 15 percent by weight polymerized units of at least one aromatic olefin containing 8 to 14 carbon atoms, and 50 to 70 percent by weight rubber; said composition having a carbon dioxide permeability of less than 0.045 barrer; and shaped articles made therefrom.

39 Claims, No Drawings

POLYMERS OF ACRYLONITRILE AND AROMATIC OLEFINS WHICH CONTAIN GRAFTED RUBBER

RELATED APPLICATION

The present application is a continuation-in-part of copending application Ser. No. 199,766, filed on Nov. 17, 1971 and now U.S. Pat. No. 3,819,762.

The invention relates to acrylonitrile/aromatic olefin copolymers. Particularly, this invention relates to copolymers of acrylonitrile and aromatic olefins wherein the copolymers contain 76 to 85 percent by weight acrylonitrile polymerized units, said copolymers having a critical melt viscosity and inherent viscosity. More particularly, this invention relates to compositions containing acrylonitrile/aromatic olefin copolymers and optionally grafted rubber; the permeability of the composition being critical.

Copolymers of acrylonitrile and vinylidene aromatic compounds, alpha-monoolefins of 2 to 8 carbon atoms or methylene glutaronitrile have been discussed. Blends of such copolymers with 0 to 25 parts by weight of a grafted preformed rubber have also been discussed. (U.S. Pat. No. 3,451,538). The preparation of copolymers of acrylonitrile and aromatic olefins is discussed in British Pat. No. 1,185,305.

The copolymers of acrylonitrile and aromatic olefins heretofore prepared have not been sufficient for end uses in items such as beverage bottles for they failed in one or more of the following properties: melt stability, melt viscosity, permeability and toughness. In beverage bottles, it is important to have the weight of the bottle as low as possible so that the amount of polymer utilized is kept to a minimum. Therefore, permeability and toughness of the materials out of which the bottles are prepared must be at an optimum for the materials to be sufficient. Another factor, however, which is critical is the melt viscosity of the material which is to be processed into a bottle. The melt viscosity must be such that the bottle can be easily prepared from the material and the material must be stable during such processing.

A composition has been found which has a combination of properties which fulfills the requirements heretofore set forth as critical and also including in the combination of properties improved impact strength when grafted rubber is used. It is a composition consisting essentially of (A) 65 to 100 percent by weight of a polymer consisting essentially of 76 to 85 percent by weight acrylonitrile polymerized units and 24 to 15 percent by weight polymerized units of at least one aromatic olefin containing 8 to 14 carbon atoms, said polymer having a melt viscosity of $10^4$ to $10^6$ poises at 220°C. and an inherent viscosity of 0.3 to 1.0 deciliter per gram
and
(B) 0 to 35 percent by weight of grafted rubber, said grafted rubber consisting essentially of 30 to 50 percent by weight of a graft polymer consisting essentially of 61 to 85 percent by weight acrylonitrile polymerized units and 39 to 15 percent by weight polymerized units of at least one aromatic olefin containing 8 to 14 carbon atoms, and 50 to 70 percent by weight rubber with the acrylonitrile portion of the graft polymer being no more than 15 percent absolute less than the acrylonitrile content of (A);
said composition having a carbon dioxide permeability of less than 0.045 barrer.

Thus, a composition has also been found which has a combination of properties which fulfills the requirements heretofore set forth as critical, namely, a composition consisting essentially of (A) 65 to 100 percent by weight of a polymer consisting essentially of 76 to 85 percent by weight acrylonitrile polymerized units and 24 to 15 percent by weight polymerized units of at least one aromatic olefin containing 8 to 14 carbon atoms, said polymer having a melt viscosity of $10^4$ to $10^6$ poises at 220°C. and an inherent viscosity of 0.3 to 1.0 deciliter per gram
and
(B) 0 to 35 percent by weight of grafted rubber, said grafted rubber consisting essentially of 30 to 50 percent by weight of a graft polymer consisting essentially of 76 to 85 percent by weight acrylonitrile polymerized units and 24 to 15 percent by weight polymerized units of at least one aromatic olefin containing 8 to 14 carbon atoms, and 50 to 70 percent by weight rubber;
said composition having a carbon dioxide permeability of less than 0.045 barrer.

Additionally, a composition has been found that in addition to the critical properties set forth heretofore, demonstrates improved impact strength when the component (B) of the aforesaid composition is utilized and the graft polymer of component (B) consists essentially of 61 to 79 percent by weight acrylonitrile polymerized units where the acrylonitrile content of the graft polymer portion of component (B) is 15 to 3 percent absolute by weight less than the acrylonitrile content of (A). The improved impact strength would result in a composition consisting essentially of (A) 65 to 90 percent by weight of a polymer consisting essentially of 76 to 85 percent by weight acrylonitrile polymerized units and 24 to 15 percent by weight polymerized units of at least one aromaic olefin containing 8 to 14 carbon atoms, said polymer having a melt viscosity of $10^4$ to $10^6$ poises at 220°C. and an inherent viscosity of 0.3 to 1.0 deciliter per gram, and (B) 10 to 35 percent by weight of grafted rubber, said grafted rubber consisting essentially of 30 to 50 percent by weight of a graft polymer consisting essentially of 61 to 79 percent by weight acrylonitrile polymerized units and 39 to 21 percent by weight polymerized units of at least one aromatic olefin containing 8 to 14 carbon atoms, and 50 to 70 percent by weight rubber with the acrylonitrile portion of the graft polymer being 15 to 3 percent absolute by weight less than the acrylonitrile content of (A) said composition having a carbon dioxide permeability of less than 0.045 barrer.

Thus, the compositions of the present invention wherein component (B) is present may contain from 1 to 35 percent by weight of component (B) and 65 to 99 percent by weight of component (A), preferably 5 to 30 percent by weight of component (B) and 70 to 95 percent by weight of component (A).

The preferred aromatic olefins are styrene and styrene derivatives. Representative examples include styrene, 4-methyl styrene, 4-(t-butyl)styrene, 3-methyl styrene, 2,4-dimethyl styrene, 2,6-dimethyl styrene, and 2,4-diisopropyl styrene. Styrene is the most preferred. Combinations of the aromatic olefins can be utilized. Alpha-methyl styrene can be used in combination with one of the above styrenes, preferably styrene which is not substituted. The preferred amount of acrylonitrile polymerized units in component (A) is 78 to 82 percent by weight while the preferred amount of the aromatic olefin polymerized units is 22 to 18 percent by weight. The composition is most preferably 80 to 90 percent by weight of component (A) and 10 to 20 percent by weight of component (B).

The grafted rubber normally contains 30 to 50 percent by weight, preferably 33 to 40 percent by weight, of a graft polymer which consists essentially of 61 to 85 percent by weight acrylonitrile polymerized units and 39 to 15 percent by weight aromatic olefin polymerized units. The remainder of the grafted rubber is the rubber which is normally 50 to 70 percent by weight, preferably 60 to 67 percent by weight, of the grafted rubber. Representative of rubbers which are useful in the composition are those of conjugated dienes. The conjugated diene polymerized units of such rubbers normally comprise 50 to 100 percent by weight of the rubber. The rubber can contain 0 to 50 percent by weight polymerized units selected from the class consisting of styrene polymerized units, acrylonitrile polymerized units, and mixtures thereof. The preferred conjugated dienes are butadiene and isoprene. A preferred rubber is one comprising 80 percent by weight butadiene polymerized units and 20 percent by weight styrene polymerized units where component (A) is 80 percent by weight acrylonitrile and 20 percent by weight styrene.

The graft polymer of the grafted rubber of component (B) of the composition normally has a composition similar to that of the polymer of component (A). Such a similarity is desirable in that it promotes the compatibility of components (A) and (B) and the clarity of the final composition. However, where even greater impact strength is needed, the component (B) should have a lower acrylonitrile content than component (A). Preferably, the composition of the graft polymer is 76 to 82 percent by weight acrylonitrile polymerized units and 24 to 18 percent by weight polymerized units of the aromatic olefin. Most preferably, for greater impact strength is the composition of the graft polymer of 61 to 79 percent by weight acrylonitrile polymerized units and 39 to 21 percent by weight polymerized units of the aromatic olefin with a component (A) composition of acrylonitrile polymerized units from 3 to 15 percent absolute by weight more than in the graft polymer portion of component (B). Aromatic olefins which are preferred in the graft polymer are the same as those recited above for the polymer of component (A).

The compositions of this invention made up of component (A) and (B) are comprised of acrylonitrile/aromatic olefin polymers in which each molecule is composed of substantially the same acrylonitrile/aromatic olefin content as the overall acrylonitrile/aromatic olefin polymer by virtue of the synthesis conditions whereby the ratio of the acrylonitrile and aromatic olefin monomers are maintained in substantially constant and predetermined ratio in the polymerization reactor. For example, where acrylonitrile and styrene are involved, the acrylonitrile/styrene composition by weight of each molecule of (A) or the graft polymer in (B) is substantially the same as the acrylonitrile/styrene overall composition of (A) or of the graft polymer in (B).

As stated above, it is critical that the melt viscosity of the polymer of component (A) be within the range of $10^4$ to $10^6$ poises at 220°C. Melt viscosity as used throughout the specification and in the claims is measured with a cone and plate rheometer at a stress $7.9 \times 10^3$ dynes per $cm^2$. The apparatus used for determining melt viscosity is described in "Stress Relaxation After Steady Shearing: Applications and Empirical Representation" by E. Menfee in the *Journal of Applied Polymer Science*, Vol, 8, p. 849–861, 1964. The initial value of viscosity is the value reported as melt viscosity.

The melt viscosity range stated above is required for the composition to be processable into shaped articles, particularly beverage bottles for the manufacture of such shaped articles is normally accomplished by extrusion-blow molding or injection blow-molding of the composition. To be most useful as far as melt processability is concerned, the composition should have a melt viscosity of from $2 \times 10^{14}$ to $4 \times 10^5$ poises at 220°C. Compositions containing component (A) polymers which consist of more than 85 percent acrylonitrile polymerized units become prohibitively viscous with regard to melt processability.

The composition must also be melt stable. The melt stability is determined by measuring the melt viscosity continuously (as described above) for a period of one hour. The curve of log $\eta$ versus time can be characterized by two quantities $S_1$ and $S_2$. These are the values of $d(\log \eta)/dt$ in the intervals 0–20 minutes and 20–60 minutes respectively. For particularly stable compositions a single value suffices for the 60-minute period. From these quantities can be calculated the value of $T_2$, the time in minutes for the melt viscosity to double ($T_2 = 41.6S_1$). If the value of $T_2$ is much greater than 20 minutes, an average value of $S_1$ and $S_2$ can be used for $S_1$. $T_2$ is therefore a measure of melt stability. A composition with good melt stability is required for molding, particularly for continuous type molding operations. Such stability allows one to set the molding machine at certain conditions which will not change for lengthy periods of time. Another reason for requiring that the compositions have good melt stability is that it is possible to regrind such a composition and reprocess it through molding equipment.

In order for the composition to have useful properties after it is formed into the shaped articles, i.e., resistance to creep and high impact strength, it is necessary that the inherent viscosity of the polymer of component (A) which is an indication of molecular weight be within the range stated above, i.e., from 0.3 to 1 deciliter per gram. Inherent viscosity is measured on a 0.5 gram per deciliter solution of the polymer in $\gamma$-butyrolactone a 35°C. Inherent viscosity is defined as $$\frac{\ln (\eta_r)}{c},$$

where $\eta_r$ is the relative viscosity (flow time of solution/flow time of solvent) and $c$ is the concentration of polymer in g/dl. The inherent viscosity is determined on a Ubbelohde viscometer.

Permeability is an important consideration in the preperation of shaped articles, particularly bottles; specifically beverage bottles. It is necessary that the carbon dioxide permeability of the composition be less than 0.045 barrer in order for the composition to be useful. Permeability is decreased as acrylonitrile content increases in the composition. The carbon dioxide permeability of the polymer of component (A) of the composition should normally be less than 0.02 barrer.

The rubber in component (B) of the composition is less resistant to permeation of carbon dioxide than the polymer of component (A) or of the graft polymer of component (B). Therefore, the permeability of the composition as a whole, if grafted rubber is utilized, is somewhat more than the permeability of the polymer of the graft and of component (A).

Carbon dioxide permeability measurements are made following the procedure outlined in ASTM D-1434 (Method M). permeability is expressed in barrers which have the units $$\frac{10^{-10} \text{ (cc. carbon dioxide at standard temp. and pressure) (cm)}}{(\text{cm}^2) (\text{second}) (\text{cm mercury})}$$

The polymer of component (A) can be prepared by either a batch process or a continuous process. It is convenient to use an emulation system, but a suspension system can be used. In the batch emulsion method, generally all of the acrylonitrile is added at the beginning together with enough aromatic olefin to yield a copolymer of the desired composition. It is important that the ratio of concentration of the aromatic olefin to acrylonitrile be maintained as close as possible to this initial ratio of concentration during the subsequent polymerization. For the range of polymers disclosed here, the composition of the polymer being formed at any instant is extremely sensitive to the (small) concentration of aromatic olefin. If this concentration is allowed to fall by more than 25 percent of the desired value, long sequences of acrylonitrile residues will be present in the polymer and provide sites for rapid local degradation and consequent discoloration during processing. This also causes a substantial increase in melt viscosity and decreased melt stability, thereby reducing the ability to refabricate scrap polymer. The compositions of this invention by virtue of said molecular regularity may be melt formed into articles, for example bottles, which in turn may be recycled, that is reprocessed by melt forming into new articles.

The careful control of the monomer concentrations provides the ability to produce the polymers described of this invention. One method for achieving this control involves first deciding on a rate of addition of olefin to the reaction and measuring the actual composition being formed by gas chromatographic analysis of the monomer present in the reaction vessel. The reaction rates can then be used to calculate new feed rates for a second experiment, and these new feed rates generally yield a satisfactory product.

The grafted rubber of component (B) can be prepared using the techniques described above in the presence of rubber.

If an emulsion polymerization process is used, the products of the synthesis are in the form of polymer latices. According to the particular composition desired, the polymer of component (A) latices and optionally the rubber containing latices are stirred together and coagulated by usual methods, such as heating with steam, addition of salts of multivalent metals or freezing and thawing. The coagulated crumb is then dried and freed from residual monomer and compounded by extrusion at about 200°C. to 220°C. to convert it to molding powders. (Vacuum extraction of residual water or monomer may be desirable during this step).

Small to moderate quantities of additives may be added as desired to the compositions, for example, antioxidants and other stabilizers, pigments and dyes. These can be incorporated by conventional methods; for instance, by adding them to the powdered composition before compounding by extrusion or other suitable mixing methods or by dry blending with the compositions in molding powder form and re-extruding.

The composition is useful as various shaped articles and as films. Particular shaped articles of interest are bottles, particularly beverage bottles. Such may be prepared by conventional methods such as extrusion and injection blow molding.

The properties of the compositions, particularly toughness, are significantly improved by orientation The orientation is normally carried out by rapidly stretching the compositon at temperatures below those necessary for melt processing but above the heat distortion temperature, (for example, in the range 120°C. to 180°C.) and then cooling rapidly to below the heat distortion temperature. Two exemplary methods of producing orientation are vacuum forming and the method described in "Waste-free cold parison blow molding" by Jack E. Hauck, *Modern Plastics*, October, 1970. One preferred beverage bottle is made by biaxially orienting a composition which is 100 percent by weight of component (A).

The following examples are meant to illustrate but not to limit the invention. Parts and percentages are by weight unless otherwise specified.

In the examples melt flow was determined as described in ASTM D-1238 with the following provisions: load — 5060 g., die — 0.082 inch diameter, and temperature — 220°C. The value of the other properties related in the Examples were determined by procedures recited therewith or by the procedures set forth above.

EXAMPLE I

To a batch autoclave of 14 gallons net capacity were charged 46.5 pounds of water, 18.2 pounds of acrylonitrile, 131 ml. styrene, 76.3 grams of lauryl mercaptan, 900 cc. of a ten percent solution in water of (p-nonyl phenyl)-omega-hydroxypoly (oxyethylene)]mixture of dihydrogen and monohydrogen phosphate esters with an acid number at pH 5.2 of 62—72 — General Aniline and Film Co.] Before addition, the 10 percent solution was brought to a pH of 7 by adding ammonium hydroxide. The charge was stirred at 150 rpms and heated to 60°C. by passing warm water through the jacket of the autoclave. Prior to heating oxygen was removed from the autoclave by bubbling a slow stream of nitrogen through the batch. A solution of 2.9 grams of potassium persulfate in 72 cc. of water was then added. After an induction period of 58 seconds, the start of the reaction was signalled by a rise in temperature of about 0.2°C. At this time, addition of 101.8 grams of lauryl mercaptan in 4.4 pounds of styrene was begun. Addition of this styrene solution was continued for the balance of the run at rate shown below designed to hold the ratio of styrene monomer to acrylonitrile monomer in the autoclave at a constant value.

| Time, Minutes | Addition, Rates of Styrene Solution, ml/min | Time, Minutes | Addition, Rates of Styrene Solution, ml/min |
|---|---|---|---|
| 0–15 | 10 | 96–108 | 10.2 |

-continued

| Time, Minutes | Addition, Rates of Styrene Solution, ml/min | Time, Minutes | Addition, Rates of Styrene Solution, ml/min |
|---|---|---|---|
| 15–40 | 10.8 | 108–137 | 8.8 |
| 40–60 | 11.3 | 137–141 | 8.0 |
| 60–76 | 12.1 | 141–144 | 7.6 |
| 76–80 | 12.6 | 144–150 | 7.0 |
| 80–83 | 11.5 | 150–170 | 6.0 |
| 83–90 | 11.2 | 170–183 | 5.2 |
| 90–96 | 10.8 | 183–200 | 4.4 |

After 60 minutes of reaction time the addition of an additional 1070 cc. portion of the 10 percent solution of (p-nonyl phenyl)-omega-hydroxypoly(oxyethylene)[mixture of dihydrogen and monohydrogen phosphate esters with an acid number at pH 5.2 of 62–72 — General Aniline and Film Co.] described above was commenced. It was added over an 80-minute period. The total reaction time was 200 minutes.

The batch temperature ranged from 60° to 60.8°C. over the course of the run and was controlled by adjusting the temperature of the water fed to the jacket of the autoclave. Samples of the reaction mixture were withdrawn after 20, 40, 60, 80, 100, 130, 160 and 200 minutes of the reaction. These were analyzed for styrene and acrylonitrile monomers by gas chromatography. These analyses are listed in Table 1.

TABLE I

MONOMER CONCENTRATIONS DURING POLYMERIZATION REACTION

| Reaction Time Mins. | Acrylonitrile (AN) | Concentration % by weight Styrene (S) | $(\frac{S}{AN})10^2$ | S/AN 0.0143 | Conversion of AN % |
|---|---|---|---|---|---|
| 0 | 23.6 | 0.376 | 1.59 | 1.11 | 0 |
| 20 | 23.4 | 0.356 | 1.52 | 1.06 | 0.9 |
| 40 | 20.5 | 0.292 | 1.42 | 0.99 | 13.1 |
| 60 | 17.9 | 0.227 | 1.27 | 0.889 | 24.2 |
| 80 | 15.1 | 0.197 | 1.30 | 0.91 | 36.0 |
| 100 | 12.7 | 0.159 | 1.25 | 0.875 | 46.2 |
| 130 | 9.68 | 0.134 | 1.38 | 0.965 | 59.0 |
| 160 | 6.26 | 0.0912 | 1.46 | 1.02 | 73.5 |
| 200 | 5.28 | 0.0831 | 1.57 | 1.1 | 77.6 |

The Table indicates that a constant monomer composition ratio was maintained throughout the reaction. Maximum deviation from the goal of S/AN = 0.0143 was 12.5 percent. The final conversion of acrylonitrile was 77.6 percent. The overall composition of the polymer calculated from gas chromatography analysis was 78.8 percent by weight acrylonitrile polymerized units.

After 200 minutes the reactor was rapidly cooled down and the polymer emulsion was discharged. A portion of the emulsion was coagulated by freezing and the resulting polymer crumb was filtered, washed with water 3 times and once with methanol and dried in a vacuum oven at 80°C. for 24 hours. The dried polymer had a melt flow of 1.7 decigrams per minute. The nitrogen content was determined to be 20.5–21.04 % by the Dumas procedure (determined on CHN Analyzer No. 185 made by F and N Instrument Company, Avondale, Pa.). This corresponded to acrylonitrile content of 77.6 to 79.6 which agreed well with the value of 78.8 from the gas chromatography analysis.

The melt stability of the polymer was excellent having an estimated time for a two-fold increase in melt viscosity at 220°C. of at least 12 hours. The melt viscosity of the polymer was $1.0 \times 10^5$ poises at 220°C. while the inherent viscosity was 0.56 deciliter per gram.

EXAMPLE II

A 4-liter flanged, jacketed, glass reactor was equipped with a mechanical stirrer, thermocouple, reflux condenser and sampling part. Constant reaction temperature was maintained by adjusting the temperature of the water circulated through the reactor jacket. The reactor was thoroughly purged with nitrogen before use. The following ingredients were charged to the reactor:

| | |
|---|---|
| Acrylonitrile | 825 grams |
| Styrene | 11.72 grams |
| (p-nonyl phenyl)-omega-hydroxypoly-(oxyethylene)[mixture of dihydrogen and monohydrogen phosphate esters with an acid number at pH 5.2 of 62–72 — General Aniline and Film Co.] | 8.25 grams in a 200 ml. solution — pH adjusted to 6.8 with ammonium hydroxide |
| Lauryl mercaptan | 3.81 grams |
| Water | 2000 mls. |

The water was distilled water which was purged overnight with nitrogen prior to use. The organic ingredients had been degassed to remove by alternatively evacuating and purging with nitrogen 3 times.

The reactants were heated and stabilized in temperature at 60°C. Initiator solution (7.2 mls. of a solution of 1 gram of potassium persulfate in 25 ml. of distilled water) was injected. The temperature was followed closely to detect the onset of polymerization. Twelve minutes after the addition of the initiator a rise of about 0.5°C. in temperature was observed. At this time the addition of the styrene solution was commenced. The styrene solution consisted of 400 grams styrene and 10.2 grams of lauryl mercaptan. The reaction rates at various times had been determined by gas chromatographic analysis of reaction mixtures taken during previous runs. Thus, the following feed rates for the styrene solution were calculated on the basis of the rates of reaction of acrylonitrile in previous experiments.

TABLE II

| Time (minutes) (After onset of Polymerization | Expected Rate, R[1], %/minute | Styrene Solution Feed Rate[2] (cc/minute) |
| --- | --- | --- |
| 0–25 | 0.45 | 1.02 |
| 25–80 | 0.62 | 1.38 |
| 80–100 | 0.50 | 1.15 |
| 100–130 | 0.40 | 0.90 |

[1] R = % of acrylonitrile in initial charge reacting per minute.
[2] Styrene solution feed rate for an 80/20 AN/styrene copolymer = $\frac{R}{d}$[825/4 − styrene(initial charge)] + Rx(RSH)

where R is defined in (1),
d = density of styrene, and
(RSH) = volume of lauryl mercaptan to be fed if all of the acrylonitrile reacted.

During the polymerization samples were withdrawn for analysis starting with the onset of polymerization with the following results:

| Time (Minutes) | 0 | 10 | 25 | 40 | 60 | 80 | 100 | 130 |
| --- | --- | --- | --- | --- | --- | --- | --- | --- |
| Styrene/AN (%) | 1.20 | 1.43 | 1.19 | 1.31 | 0.997 | 1.02 | 1.07 | 1.36 |
| Styrene/AN ratio relative to initial (%) | 100 | 119 | 99 | 109 | 83 | 85 | 89 | 113 |

The average deviation from the initial ratio was 11 percent. Conversion at 130 minutes was 77.4 percent at which time the addition of styrene was stopped and the reaction mixture cooled rapidly. Copolymer latex was coagulated by freezing and thawing. The filtered copolymer was washed with water and dried in a stream of nitrogen at 75°C. The product contained 82 percent by weight acrylonitrile polymerized units based on the percent nitrogen determined by the Dumas method (same as Example I). The resin was injection molded at 220°C. into clear plaques. It had a melt flow of 0.4 gram per 10 minutes. The following properties were obtained:

| | |
| --- | --- |
| Notched Izod Impact Strength (ft.lb./inch) (ASTM D-256) | 0.52 |
| Heat deflection temperature (°C. at 264 psi) (ASTM D-648) | 86 |
| Tensile Strength at yield (psi)(ASTM D-638) | 14,200 |
| Percent elongation at break (ASTM D-638) | 14 |
| Tensile modulus (psi) (ASTM D-638) | 760,000 |
| Permeability to carbon dioxide (Barrer) | 0.004 |

EXAMPLE III

The 4-liter reactor of Example II was utilized in this Example. The initial charge to the reactor consisted of the following:

| | |
| --- | --- |
| 20% styrene/80% butadiene (by weight) rubber latex | 935.3 grams (390 gs. of rubber on a solid basis) contains 8.3 gs. free styrene |
| Acrylonitrile | 47 grams |
| Water (distilled) | 1354.7 mls. |

The latex diluted with the water was neutralized with diluted sulfuric acid (one concentrated sulfuric acid: 10 water) to a pH of 6.5. The diluted latex and acrylonitrile were mixed and air removed by alternate evacuation and blanketing with nitrogen 3 times. The reactants were heated to 60°C. and 55 mls. solution of 6 grams of potassium persulfate in 100 mls. of water, were added. Following the addition of the persulfate initiator, a solution consisting of 80 percent acrylonitrile and 20 percent styrene by weight was fed continuously into the reactor at a rate of 1.09 mls. per minute for 230 minutes. The reactor contents were cooled and 8.2 grams of a 40 percent solution of 2,6-di-t-butyl-4-hydroxmethyl phenol was added in dispersion form. The reactor contained 43.9 grams of acrylonitrile monomer and 2.8 grams of styrene monomer after the reaction. The graft polymer on the rubber was 79.2 percent by weight acrylonitrile polymerized units, the determination being made by gas chromatographic analysis.

To 3000 parts of polymer emulsion prepared as in Example IV were added 640 parts of the grafted rubber emulsion above. The mixture was coagulated in aqueous magnesium sulfate solution, filtered, washed and then dried in a vacuum oven under nitrogen purge for 12 hours. The dried polymer was extruded through a 1-inch diameter extruder at a melt temperature of 200°C. The extruded product had excellent clarity. Melt flow at 220°C. was 1.1g/10 minutes. Notched Izod Impact Strength (ASTM D-256) measured on compression molded specimens was 1.09 ft-lb/inch.

EXAMPLE IV

To a 100-gallon jacketed stirred reactor were charged 385 pounds water, 3.6 pounds of (p-nonyl phenyl)-omega-hydroxypoly-(oxyethylene)[mixture of dihydrogen and monohydrogen phosphate esters with an acid number at pH 5.2 of 62–72 - General Aniline and Film Co. dissolved in 33.3 lbs. of water (pH adjusted to 7.0 plus or minus 0.05 with 28 percent ammonium hydroxide), 159.2 lbs. of a mixture of 158 lbs. acrylonitrile and 1.2 lbs. lauryl mercaptan, 2.83 lbs. of a mixture of 57.3 lbs. styrene and 2.7 lbs. lauryl mercaptan. The system was degassed by purging with nitrogen and evacuating with agitation. This was repeated 3 times. The charge was heated at 60°C. and 25 grams of potassium persulfate dissolved in 800 mls. of distilled water were added. After 20 minutes polymerization started and a mixture of 2.7 pounds lauryl mercaptan and 57.3 pounds styrene was fed in accordance to the schedule 0–60 minutes, 0.272 pound/min.; 60–100 minutes, 0.188 pound/min.; 100–150 minutes, 0.10 pound/min.; 150–190 minutes, 0.059 pound/min; and 190–230 minutes, 0.032 pound/min. After 230 minutes, the run was stopped with a solution of 14 grams hydroquinone monomethyl ether in 400 mls. of methanol. 248.3 Pounds of this polymer latex were mixed with 71 pounds of a grafted rubber latex (the grafted rubber consisted of 36.4 percent of acrylonitrile/styrene copolymer and 63.6 percent styrene/butadiene rubber) prepared according to the procedure of Example III using the reactor of Example I. The coagulated and dried composition contained 12 percent by weight of the styrene-butadiene rubber.

The mixture was coagulated with magnesium sulfate. The final product contained 12 percent by weight rubber, 70.9 percent by weight acrylonitrile polymerized units and the balance is styrene polymerized units based on polymerized units. This determination was by gas chromatography.

The washed, dried, powdered blend was extruded through a 53-mm. extruder at melt temperature of 195°C. at a rate of 18 pounds per hour. The power utilized was only 36 percent of the capacity. The polymer portion of the blend as distinguished from the grafted rubber had a melt viscosity of $3.3 \times 10^5$ poises at 220°C. and an inherent viscosity of 0.92 deciliter per gram in dimethyl formamide. A sample of this blend was compression molded at 220°C. to a film 7.5 mils thick. The permeability to carbon dioxide of the blend was 0.0074 barrier.

EXAMPLE V

The data which is given below in Table III was obtained on compositions which were prepared by the method described in Example IV for the polymer.

TABLE III

| Sample No. | % AN Wt. | % AN Mole | Inherent Viscosity $\eta_{inh}$ BLO 35°C. | Melt Viscosity $\eta°$ 220°C. | Melt Stability $T_2$ (minutes) |
|---|---|---|---|---|---|
| 1 | 76.7 | 86.6 | 0.60 | $4.2 \times 10^4$ | 13 |
| 2 | 76.7 | 86.6 | 0.58 | $2.8 \times 10^4$ | 11 |
| 3 | 77.0 | 86.8 | 0.58 | $3.2 \times 10^4$ | 14 |
| 4 | 76.8 | 86.6 | 0.53 | $4.2 \times 10^4$ | 16 |
| 5 | 78.2 | 87.6 | 0.52 | $3.0 \times 10^4$ | 76 |
| 6 | 76.4 | 86.4 | 0.40 | $5.0 \times 10^4$ | 12 |
| 7 | 77.0 | 86.8 | 0.55 | $2.4 \times 10^4$ | 13 |
| 8 | 76.9 | 86.7 | 0.60 | $1.2 \times 10^5$ | 41 |
| 9 | 79.0 | 88.1 | 0.43 | $5.0 \times 10^4$ | 311 |

BLO = $\gamma$-butyrolactone

EXAMPLE VI (In the following grafting run the graft composition is the same as that of the matrix. This run serves as a control for comparison with runs in which the AN content of the graft is lower than that of the matrix.)

The 4-liter reactor of Example III was utilized in this experiment. The initial charge to the reactor consisted of the following:

| | |
|---|---|
| 15.6% styrene/84.4% butadiene (by weight) latex | 844.2 g. (390 g. of rubber on a solid basis) |
| Acrylonitrile | 47 grams |
| Styrene | 3.02 grams |
| Water (distilled) | 1432.8 ml. |

The rubber used has a Mooney viscosity of 100. The rubber latex used contains residual sytrene monomer, which is therefore carried into the initial charge. The 3.02 g. of styrene shown above comes from the rubber latex and was determined by gas chromatography analysis. The procedure for grafting described in Example III was followed. Following addition of the persulfate initiator, a solution consisting of 80 percent acrylonitrile and 20% styrene by weight was fed continuously into the reactor. Feed rate was 0.85 ml. per minute for the first 60 minutes and 1.18 ml/minute between 60 and 232 minutes. At 208 minutes a total of 226 ml. of monomers have been added and a 100 ml. sample of the grafted rubber emulsion (sample A) was removed. The reaction was continued until a total of 253 ml. of monomer solution was fed. The reactor contents were cooled and 11.9 g. of a 33% dispersion of 2,2-methylene-bis-(6-t-butyl-4-methyl) phenol was added. The final product after stabilization was used in Par B of the Example. Material balance calculation based on gas chromatography analysis of unreacted monomers showed that the product mixture in Sample A contained 67.1 percent rubber and Sample B contained 23.3% solid of which 64.6% was the rubber used. The graft composition of Sample A and B are shown in Table IV.

SAMPLE A

To 300 parts of the copolymer prepared in a manner similar to that described in Example IV were added 60.7 parts of the grafted latex, Sample A. The amounts of the latices used in preparing the blend were calculated to give a rubber content of 10%. The latex mixture was coagulated by freezing overnight, thawing, filtering and washing. After washing three times the filtered polymer was dried in a vacuum oven under nitrogen purge for 12 hours. The dried polymer had a Notched Izod impact strength (ASTM Test D-256) measured in specimens compression molded at 235°C. of 1.08 ft. lb/inch.

SAMPLE B

The same procedure was followed as in Sample A except that 61.7 parts of the grafted latex was used. The dried polymer had a melt flow at 220°C. of 1.14 gram/10 minutes. Notched Izod impact strength (ASTM Test D-256) measured on specimens compression molded at 235°C. was 1.14 ft.lb/inch. The results are summarized in Table IV.

EXAMPLE VII (This Example shows the increase in impact strength using lower acrylonitrile content in the grafting monomers compared to Example VI).

Grafting reaction was carried out by the same procedure as described in Example VI except that the monomer solution fed during grafting consisted of 72% acrylonitrile and 28% styrene by weight. A total of 245 ml. of monomers was fed in 230 minutes. Material balance calculation showed that the product mixture contains 23.5% solid of which 64.4% is the rubber used. The incorporated monomers consisted of 73.4% acrylonitrile and 26.6% styrene.

A blend of the grafted rubber and copolymer was prepared in the manner described in Example VI. The dried polymer containing 10% rubber had a melt flow at 220°C. of 1.26 g/10 minutes and a notched Izod impact strength of 1.45 ft.lb/inch as measured by ASTM Test D-256 using specimens compression molded at 235°C. The molded specimen had excellent clarity. The results are summarized in Table IV.

EXAMPLE VIII (This Example shows the loss of clarity and development of haze when the acrylonitrile content in the grafting monomers is lowered further so that the graft contains 20% (absolute) less acrylonitrile than is incorporated in the copolymer).

Grafting reaction was carried out by the same procedure as described in Example VI except that the monomer solution fed during grafting consisted of 58% acrylonitrile and 42% styrene by weight. A total of 241 ml. of monomers was fed in 215 minutes. Material balance calculation showed that the product mixture contains 23.3% solid of which 64.8% is the rubber used. The incorporated monomers consisted of 59.6% acrylonitrile and 40.4% styrene.

A blend of the grafted rubber and copolymer was prepared in the manner described in Example VI. The dried polymer containing 10% rubber had a melt flow at 220°C. of 0.96 g./10 minutes and a notched Izod impact strength of 1.40 ft.lb/inch. A stack of moldings of this material totalling ½ inch in thickness is slightly hazy when viewed through a thickness of ½ inch. Haze is measured by ASTM Test D-1003 and found to be 17.4%. The results are summarized in Table II.

EXAMPLES IX TO XV

The procedure of Example VI was followed in carrying out the reactions summarized in Table IV. Table IV shows data for three batches of rubber recorded in separate columns so that comparisons within a given rubber can be made. (The known differences among the rubbers used are given in the footnote to Table IV). During the grafting process, a monomer solution is added continuously to the reaction, aimed at balancing the amounts which are consumed due to polymerization. The actual amounts of the monomers incorporated are calculated by material balance using gas chromatography analysis data.

The foregoing detailed description has been given for clarity of understanding only and no unnecessary limitations are to be understood therefrom. The invention is not limited to exact details shown and described for obvious modifications will occur to one skilled in the art.

I claim:

1. A polymer composition formed by the steps comprising
   A. polymerizing acrylonitrile and an aromatic olefin selected from monomers consisting of styrene; 4-methyl styrene; 4-(t-butyl)-styrene; 3-methyl styrene; 2,4-dimethyl styrene; 2,6-dimethyl styrene and 2,4-diisopropyl styrene or α-methyl styrene in combination with said monomer in the presence of a free radical initiator, adding said olefin throughout said polymerization to a reaction medium containing acrylonitrile and said olefin to continuously maintain a ratio of said olefin to acrylonitrile in the reaction medium within 25 percent of the ratio required to produce a polymer containing an average composition selected from the range of 76 to 85 percent by weight acrylonitrile and 24 to 15 percent by weight of said olefin, said polymer having a melt viscosity of $10^4$ to $10^6$ poises at 220°C., and an inherent viscosity of 0.3 to 1.0 deciliter per gram as measured on a 0.5 gram per deciliter solution of the polymer in gamma-butyrolactone at 35°C.; and a carbon dioxide permeability of less than 0.02 barrer;
   B. polymerizing 30 to 50 percent by weight of a graft polymer consisting essentially of 61 to 85 percent by weight acrylonitrile polymerized units and 39 to 15 percent polymerized units of at least one aromatic olefin selected from monomers consisting of styrene; 4-methyl styrene; 4-(t-butyl)-styrene; 3-methyl styrene; 2,4-dimethyl styrene; 2,6-dimethyl styrene and 2,4-diisopropyl styrene or α-methyl styrene in combination with said monomer with 50 to 70 percent by weight rubber, with the acrylonitrile portion of the graft polymer in (B) being no more than 15 percent absolute by weight less than the acrylonitrile content of (A);
   C. blending 65 to 99 percent by weight of the polymer of (A) with 1 to 35 percent by weight of polymer (B); and
   D. recovering a polymer having a carbon dioxide permeability of less than 0.045 barrer.

2. The composition of claim 1 in which the aromatic olefin is styrene.

TABLE IV

EFFECT OF AN/STYRENE RATIO IN GRAFT ON IMPACT STRENGTH OF RUBBER TOUGHENED HIGH AN/S RESIN

| | AN/Sty Ratio in Grafting | | | Notched Izod, ft.lb./in. | | | |
|---|---|---|---|---|---|---|---|
| Example | Feed Soln. | Polymerized | % Rubber In Graft | Rubber A | Rubber B | Rubber C | Haze |
| 9 | 80/20 | 81.2/18.8 | 64.1 | | 1.07 | | 9.5 |
| 6(a) | | 79.9/19.1 | 67.1 | | | 1.08 | |
| 6(b) | | 80/20 | 64.6 | | | 1.14 | |
| 11 | 77/23 | 77.7/22.3 | 64.2 | 0.92 | | | 6.0 |
| 10 | 76/24 | 76.8/23.2 | 67.4 | | 1.48 | | 8.9 |
| 14 | | | | 1.30 | | | |
| 15(a) | | 76.6/23.4 | 66.8 | | | 1.27 | |
| 15(b) | | 76.7/23.3 | 64.4 | | | 1.21 | |
| 12 | 72/28 | 72.8/27.2 | 64.6 | 1.53 | | | 5.4 |
| 7(a) | | 73.5/26.5 | 66.6 | | | 1.58 | |
| 7(b) | | 73.4/26.6 | 64.4 | | | 1.45 | |
| 13(a) | 65/35 | 67.1/32.9 | 66.7 | 1.18 | | | |
| 13(b) | | 66.3/33.7 | 64.6 | 1.20 | | | 5.8 |
| 8(a) | 58/42 | 59.6/40.4 | 67.0 | 1.28 | | | 17.4 |
| 8(b) | | | 64.8 | 1.40 | | | |

| Rubber | % BD/Styrene | Mooney Visc. | Stabilizer |
|---|---|---|---|
| A | 79.9/20.1 | 69 | None |
| B | 79.9/20.1 | 64 | 0.05% phosphite |
| C | 84.4/15.6 | 100 | None |

3. The composition of claim 2 in which the rubber comprises 50 to 100 percent by weight conjugated diene polymerized units and 0 to 50 percent by weight polymerized units selected from the class consisting of styrene polymerized units, acrylonitrile polymerized units, and mixtures thereof.

4. The composition of claim 3 in which the conjugated diene is selected from the class consisting of butadiene and isoprene.

5. The composition of claim 4 in which the polymer of (A) is 78 to 82 percent by weight acrylonitrile polymerized units and 22 to 18 percent by weight styrene polymerized units and the melt viscosity of the polymer of (A) is $2 \times 10^4$ to $4 \times 10^5$ poises at 220°C. and the graft polymer of (B) is 76 to 82 percent by weight acrylonitrile polymerized units and 24 to 18 percent by weight styrene polymerized units.

6. The composition of claim 5 in which (B) is 10 to 20 percent by weight of the compositon.

7. The composition of claim 1 wherein (B) is 1 to 35 percent by weight of a grafted rubber, said grafted rubber consisting essentially of 30 to 50 percent by weight of a graft polymer consisting essentially of 76 to 85 percent by weight acrylonitrile polymerized units and 24 to 15 percent polymerized units of at least one aromatic olefin selected from monomers consisting of styrene; 4-methyl sytrene; 4-(t-butyl)-styrene; 3-methyl styrene; 2,4-dimethyl styrene; 2,6-dimethyl styrene and 2,4-diisopropyl styrene of α-methyl styrene in combination with said monomer and 50 to 70 percent by weight rubber; said composition having a carbon dioxide permeability of less than 0.045 barrer.

8. The composition of claim 7 in which the aromatic olefin is styrene.

9. The composition of claim 8 in which the rubber comprises 50 to 100 percent by weight conjugated diene polymerized units and 0 to 50 percent by weight polymerized units selected from the class consisting of styrene polymerized units, acrylonitrile polymerized units, and mixtures thereof.

10. The composition of claim 9 in which the conjugated diene is selected from the class consisting of butadiene and isoprene.

11. The composition of claim 10 in which the polymer of (A) is 78 to 82 percent by weight acrylonitrile polymerized units and 22 to 18 percent by weight styrene polymerized units and the melt viscosity of the polymer of (A) is $2 \times 10^4$ to $4 \times 10^5$ poises at 220°C. and the graft polymer of (B) is 76 to 82 percent by weight acrylonitrile polymerized units and 24 to 18 percent by weight styrene polymerized units.

12. The composition of claim 11 in which (B) is 10 to 20 percent by weight of the composition.

13. The composition of claim 1 wherein (A) is 70 to 95 percent by weight of said polymer and (B) is 5 to 30 percent by weight with said grafted rubber consisting essentially of 30 to 50 percent by weight of a graft polymer consisting essentially of 61 to 79 percent by weight acrylonitrile polymerized units and 39 to 21 percent by weight polymerized units of at least one aromatic olefin selected from monomers consisting of styrene; 4-methyl styrene; 4-(t-butyl)-styrene; 3-methyl styrene; 2,4-dimethyl styrene; 2,6-dimethyl styrene and 2,4-diisopropyl styrene or α-methyl styrene in combination with said monomer, and 50 to 70 percent by weight rubber and wherein the acrylonitrile content of the graft polymer is 15 to 3 percent absolute by weight less than the acrylonitrile content of (A).

14. The composition of claim 13 in which the aromatic olefin is styrene.

15. The composition of claim 14 in which the rubber comprises 50 to 100 percent by weight conjugated diene polymerized units and 0 to 50 percent by weight polymerized units selected from the class consisting of styrene polymerized units, acrylonitrile polymerized units, and mixtures thereof.

16. The composition of claim 15 in which the conjugated diene is selected from the class consisting of butadiene and isoprene.

17. The composition of claim 16 in which the polymer of (A) is 78 to 82 percent by weight of acrylonitrile polymerized units and 22 to 18 percent by weight styrene polymerized units and the melt viscosity of the polymer of (A) is $2 \times 10^4$ to $4 \times 10^5$ poises at 220°C. and the graft polymer of (B) is 63 to 79 percent by weight acrylonitrile polymerized units and 37 to 21 percent by weight styrene polymerized units.

18. The composition of claim 17 in which (B) is 10 to 20 percent by weight of the composition.

19. The composition of claim 18 in the form of a shaped article.

20. The article of claim 1 in which the composition is oriented.

21. The article of claim 1 in the form of a bottle.

22. The article of claim 20 in the form of a bottle.

23. The composition of claim 7 in the form of a shaped article.

24. The article of claim 23 in the form of a bottle.

25. The composition of claim 13 in the form of a shaped article.

26. The article of claim 25 in which the composition is oriented.

27. The article of claim 25 in the form of a bottle.

28. The composition of claim 17 in the form of a bottle.

29. The article of claim 26 in the form of a bottle.

30. The composition of claim 1 wherein an emulsifier is employed in (A).

31. The composition of claim 1 wherein acrylonitrile is continuously added with said olefin in (A).

32. A polymerization process comprising
A. polymerizing acrylonitrile and an aromatic olefin selected from monomers consisting of styrene; 4-methyl styrene; 4-(t-butyl)-styrene; 3-methyl styrene; 2,4-dimethyl styrene; 2,6-dimethyl styrene and 2,4-diisopropyl styrene, or α-methyl styrene in combination with said monomer in the presence of a free radical initiator, adding said olefin throughout said polymerization to a reaction medium containing acrylonitrile and said olefin to continuously maintain a ratio of said olefin to acrylonitrile in the reaction medium within 25 percent of the ratio required to be maintained to produce a polymer with an average composition selected from 76 to 85 percent by weight acrylonitrile and 24 to 15 percent by weight of said olefin and recovering a polymer having said average composition, an inherent viscosity of 0.3 to 1.0 deciliter per gram as measured on a 0.5 gram per deciliter solution of the polymer in gamma-butyrolactone at 35°C., a melt viscosity of $10^4$ to $10^6$ poise at 220°C. and a carbon dioxide permeability of less than 0.02 barrer;
B. polymerizing 30 to 50 percent by weight of a graft polymer consisting essentially of 61 to 85 percent by weight acrylonitrile polymerized units and 39 to 15 percent polymerized units of at least one aromatic olefin selected from monomers consisting of styrene; 4-methyl styrene; 4-(t-butyl)-styrene; 3-methyl styrene; 2,4-dimethyl styrene; 2,6-dimethyl styrene and 2,4-diisopropyl styrene, or α-methyl styrene in cmbination with said monomer with 50 to 70 percent by weight rubber, with the acrylonitrile portion of the graft polymer in (B) being no more than 15 percent absolute by weight less than the acrylonitrile content of (A);

C. blending 65 to 99 percent by weight of the polymer of (A) with 1 to 35 percent by weight of polymer (B); and D. recovering a polymer having a carbon dioxide permeability of less than 0.045 barrer.

33. The process of claim 32 wherein the aromatic olefin is styrene.

34. The process of claim 33 in which the rubber comprises 50 to 100 percent by weight conjugated diene polymerized units and 0 to 50 percent by weight polymerized units selected from the class consisting of styrene polymerized units, acrylonitrile polymerized units, and mixtures thereof.

35. The process of claim 34 in which the conjugated diene is selected from the class of butadiene and isoprene.

36. The process of claim 32 in which the polymer of (A) is selected from 78 to 82 percent by weight acrylonitrile polymerized units and 22 to 18 percent by weight styrene polymerized units and the melt viscosity of the polymer of (A) is $2 \times 10^4$ to $4 \times 10^5$ poises at 220°C. and the graft polymer of (B) is selected from 76 to 82 percent by weight acrylonitrile polymerized units and 24 to 18 percent by weight styrene polymerized units.

37. The process of claim 34 in which (B) is 10 to 20 percent by weight of the composition.

38. The process of claim 31 in which an emulsifier is employed in (A).

39. The process of claim 32 wherein acrylonitrile is continuously added with said olefin in (A).

* * * * *